United States Patent Office 3,118,173
Patented Jan. 21, 1964

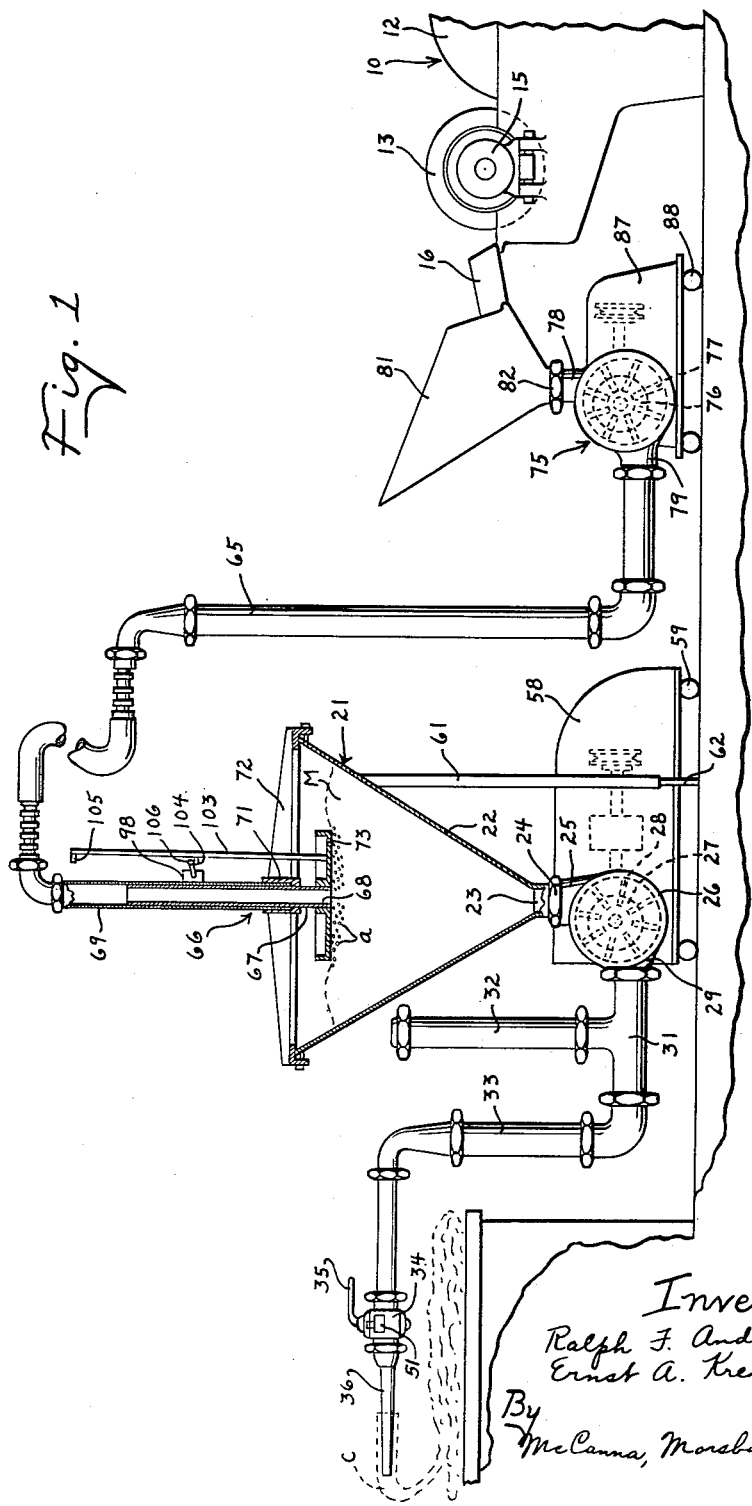

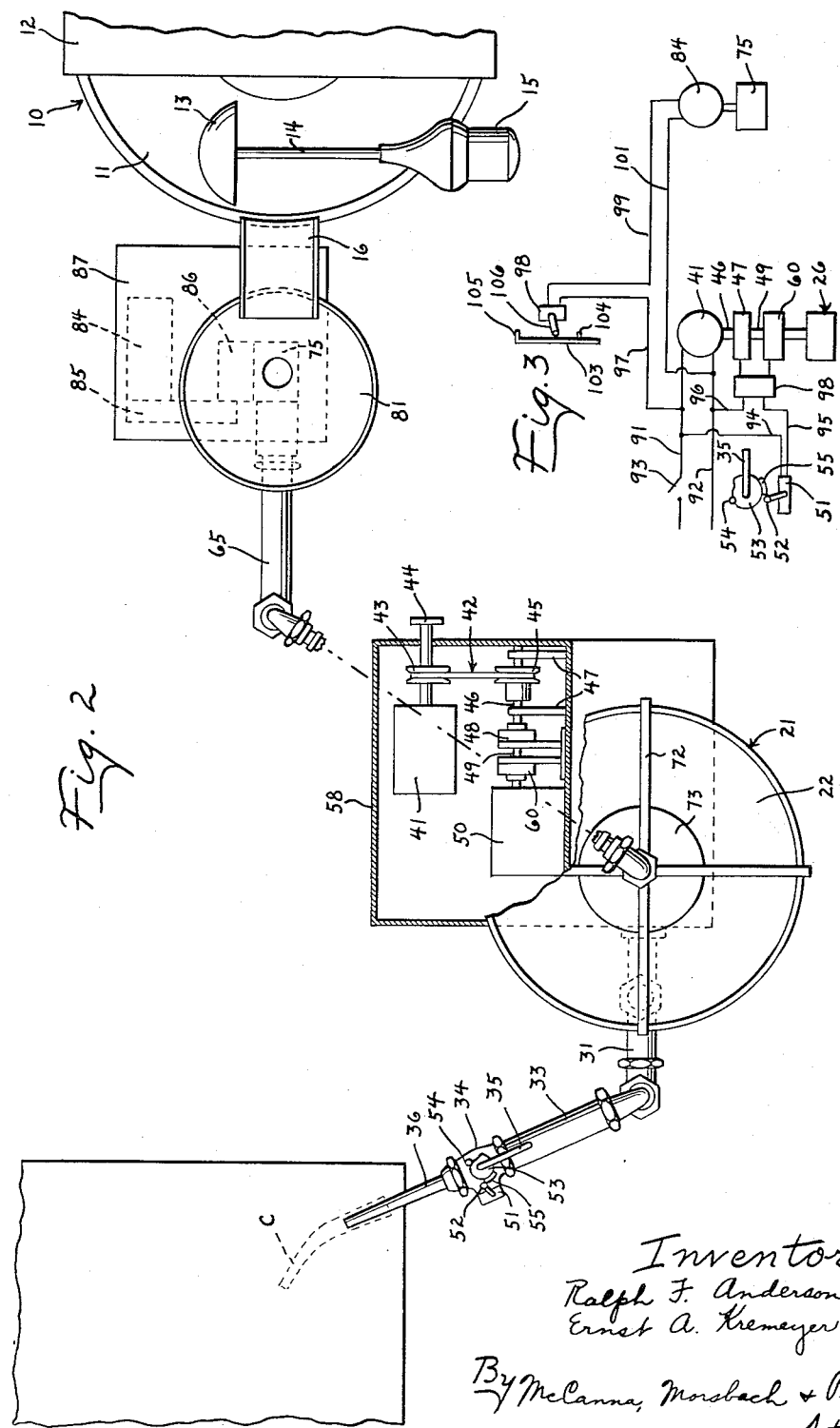

3,118,173
SAUSAGE STUFFING APPARATUS
Ralph F. Anderson, 332 Calvin Park Blvd., Rockford, Ill., and Ernst A. Kremeyer, Rockford, Ill.; said Kremeyer assignor to said Anderson
Filed May 3, 1960, Ser. No. 26,507
7 Claims. (Cl. 17—37)

This invention relates to improvements and apparatus for feeding semi-fluid materials and particularly to an apparatus for stuffing sausage casings and the like.

In the preparation of sausage and the like, the stuffing material is ground to form a smooth plastic mass which is sufficiently fluid to enable it to be forced under pressure into a sausage casing. Air is frequently entrained in this mass during the grinding and in the subsequent handling of the ground stuffing material and it is necessary to remove the air and any gaseous occlusions from the material prior to filling the sausage casing to eliminate pockets in the sausages. Heretofore, the gaseous occlusions have been removed from the stuffing material by first feeding the material into a container, sealing the container, and thereafter drawing a low vacuum over the material in the container to aid in extracting the occluded gases from the mass of material. The stuffing material was then pumped from the container while the vacuum was maintained thereon into the sausage casing. Such a system for stuffing sausage casings is relatively slow since the material must be handled in batches. Moreover, since the low vacuum is maintained over the material in the container during the stuffing operation, it effectively increases the head against which the stuffing pump must operate, and thus reduces the overall efficiency of the pump. In addition, the container for such a system had to be specially constructed of heavy weight material to withstand the pressures applied thereto, and had to have provision for effecting an air tight seal between the cover and the container to enable drawing of a vacuum in the container.

An important object of this invention is to provide a system for removing gaseous occlusions from semi-fluid material which enables the withdrawal of the material from the hopper or container while the supply of material in the hopper is being replenished to provide more rapid dispensing of the material.

Another object of this invention is to provide an improved arrangement for feeding semi-fluid material into the hopper, which apparatus is arranged to prevent entrapping of air in the material as it enters the hopper and to vent any gases previously entrapped in the semi-fluid material before the material passes into the hopper.

Another object of this invention is to provide an apparatus for stuffing semi-fluid material into sausage casings and in which the drawing of air by the stuffing pump, during withdrawal of material from the hopper, is effectively prevented.

A further object of this invention is to provide apparatus in accordance with the foregoing object wherein the flow of material to the hopper is automatically controlled to maintain an adequate supply of material in the stuffing hopper.

These, together with various ancillary objects and advantages of this invention will be more readily appreciated as the same becomes better understood by reference to the following detailed description when taken in connection with the accompanying drawings wherein:

FIGURE 1 is a diagrammatic view of the sausage stuffing apparatus, showing the same in elevation and with parts broken away and shown in section to illustrate details of construction;

FIG. 2 is a diagrammatic plan view of the stuffing apparatus with parts broken away and shown in section to illustrate details of construction; and FIG. 3 is a schematic wiring diagram illustrating the controls for the stuffing apparatus.

The stuffing material is ground in a conventional sausage grinder diagrammatically indicated at 10 and which includes an annular carrier 11 which is rotatable about an upright axis and which advances the material past the grinder mechanism 12. After the material has been ground to the proper consistency, it is removed from the carrier 11 by a dished transfer blade 13 which is connected to a shaft 14 and driven by a suitable motor 15 which lifts the material from the carrier and discharges the same into the chute 16. The stuffing material as it leaves the hopper is in a form sustaining plastic condition and contains occluded air which is entrapped therein during the grinding operation, and also during the transfer of the material from the carrier 11 into the chute 16. In accordance with the present invention, provision is made for feeding the semi-fluid material into a stuffing hopper 21 in such a manner as to remove the air which has previously been entrapped in the material and to prevent entrapping of further air as the semi-fluid material enters the stuffing hopper.

As best shown in FIG. 1, the stuffing hopper 21 has downwardly tapering walls 22 and a discharge opening 23 at its lower end. The discharge opening is connected through a disconnect fitting 24 to the inlet 25 of a stuffing pump 26. The stuffing pump as herein shown includes a rotor 27 disposed eccentrically of the pump housing and a plurality of vanes 28 which form a sliding seal between the rotor and housing to withdraw the material from the hopper and discharge the same under pressure to the outlet 29 of the pump. The pump outlet is connected through a T-fitting 31 having a surge chamber 32 connected thereto, and the outlet of the T-fitting is connected through a conduit 33 to a stuffing valve 34. The valve has an operating handle 35 for turning the stuffing valve off and on and controls the flow of material to the stuffing nozzle 36.

As best shown in FIG. 2, the pump rotor 27 is driven from a motor 41 through a variable speed drive 42. The variable speed drive is of conventional construction and includes a drive pulley 43 which is adjustable by a knob 44 to control its effective diameter, and a spring loaded driven pulley 45 which maintains a preselected belt tension. The speed adjusting mechanism enables adjustment of the speed of the pump 26 and consequently controls the rate at which the stuffing material is fed to the sausage casing C. The driven pulley 45 is connected through a shaft 46 supported in bearings 47 and through a clutch 48 to a shaft 49. The shaft 49 is connected through a gear reducer 50 to the pump rotor 27. The clutch is selectively operable to provide rapid starting and stopping of the stuffing pump and is arranged to establish a driving connection to the pump when the stuffing valve 34 is open and to interrupt the drive to the pump when the stuffing valve is closed. The consistency of the stuffing material varies somewhat with pressure, and it is desirable to maintain the line 33 between the pump and the stuffing valve under pressure, when the valve is shut off, so that the initial charge of material fed to the casing when the valve is subsequently opened will have the proper consistency. For this purpose, a brake 60 is provided for selectively locking the shaft 49 against rotation when the clutch 48 disconnects the drive to the shaft 49. The clutch 48 and brake 60 are preferably of the type arranged for electromagnetic actuation and may be of any conventional construction, details of which form no part of the present invention.

The clutch and brake are controlled by a switch 51 on the stuffing valve 34 and which switch is arranged to energize the clutch and release the brake when the stuffing valve is open, to establish a driving connection from the motor to the pump, and which automatically disengages the clutch and applies the brake to stop the pump and maintain the line 33 under pressure, when the stuffing valve 34 is closed. As best shown in FIG. 2, the switch 51 has an actuator 52 which is operated by a cam 53 attached to the valve operating handle 35. A stop 54 engages the cam 53 to limit movement of the valve between an open and closed position, and a lobe 55 on the cam engages the actuator 52 to open the switch when the valve is in its closed position shown in FIG. 2. The motor 41, variable speed drive 42, clutch 48, brake 60 and speed reducer 49 are conveniently enclosed in a housing 58 which is supported on casters 59 to facilitate movement of the unit, and the hopper is supported on the pump for movement with the housing 58. Auxiliary support legs 61 are attached to the hopper 21 and have adjustable lower ends 62 arranged to engage the ground to support the hopper after it has been moved into position.

The semi-fluid stuffing material is fed into the stuffing hopper 21 under pressure through a conduit 65. An air eliminator device 66 is provided at the discharge end of the conduit and includes a pipe 67 having a discharge orifice 68 at its lower end. The pipe is mounted for vertical movement relative to the hopper 21 and, as shown herein, the pipe is telescopically received in a lower pipe section 69 of the conduit 65 and is slidably sealed thereto by a gland 71. The gland 71 is supported by radially extending arms 72 on the upper edge of the hopper 21. A plate 73 is attached to the pipe 67 and extends outwardly from the discharge opening 68 therein to rest on the upper surface of the semi-fluid material M in the stuffing hopper. The plate has sufficient area to support itself and the weight of the pipe section 67 on the material so that the plate moves up and down with the level of the material in the hopper. In this manner, the discharge opening 68 is maintained at the level of the material M in the hopper. With this arrangement, the semi-fluid material from the conduit 69 is always discharged at the surface of the material M in the hopper and does not pass through the air as it enters the hopper and, consequently, does not entrain or entrap any additional air upon being fed to the hopper. Any air which was previously entrained or entrapped in the fluid material is compressed as it flows through the conduit 65 and, upon reaching the orifice or discharge opening 68, it expands and the bubbles designated by the letter $a$ in FIG. 1 pass outwardly below the plate 73 and into the atmosphere. In this manner, the air previously entrapped in the semi-fluid material is effectively vented to the atmosphere. In addition, the plate 73 is positioned so that it is disposed vertically above the discharge openings 23 in the hopper. The semi-fluid material does not flow readily under gravity and, when the stuffing pump 26 is operated, it tends to draw from the column immediately above the opening and form an "air core" in the mass of material M in the hopper. The plate 73, however, overlies the discharge opening and effectively prevents the pump from drawing air so long as material remains in the hopper.

In the embodiment shown, a transfer pump 75 is provided for conveying material from the grinder 10 and for delivering the same under pressure to the conduit 65. The pump 75 is also the vane type and includes a rotor 76 (FIG. 1) and a plurality of vanes 77 which draw the material from the inlet 78 and discharge the same under pressure through the outlet 79 to the transfer conduit 65. A transfer hopper 81 is connected by a gland 82 to the pump inlet 78 and is positioned to receive the ground stuffing material from the chute 16. As best shown in FIG. 2, the pump 75 is driven from a motor 84 through a variable speed drive 85 and gear reducer 86, all of which are enclosed in a housing 87. The housing 87 is advantageously supported on casters 88 to facilitate movement of the same into and out of position at the grinder 10.

Reference is now made to the schematic wiring diagram for the apparatus shown in FIG. 3. Power is supplied to the stuffing pump motor through conductors 91 and 92 under the control of the main power switch 93. A stuffing valve switch 51 is connected through conductor 94 to the power conductor 91, and through conductor 95 to the clutch and brake control unit 98, which control unit is otherwise connected through conductor 96 to the other power conductor 92. The transfer pump motor 84 is connected through conductor 97, switch 98, conductor 99 and conductor 101 to the power conductors 91 and 92 to be energized when the switch 98 is closed. In accordance with the present invention, provision is made for operating the switch 98 selectively in accordance with the level of the material M in the stuffing hopper 21 to maintain a supply of material in that hopper. The switch 98 is of the toggle type and an arm 103 having spaced stops 104 and 105 thereon is attached to the plate 73 for movement therewith. The stop 104 is arranged to engage the actuator 106 of the switch 98 when the plate rises to a preselected upper level, to thereby stop the transfer pump motor 84, and the stop 105 is arranged to engage the actuator when the plate drops to a preselected lower level, to thereby start the transfer pump motor.

From the foregoing it is thought that the operation of the apparatus will be readily understood. The stuffing material after being ground to the proper consistency is transferred by the rotary transfer device 13 through chute 16 into the transfer hopper 81. The transfer pump is operated under the control of the switch 98 to feed the material from the transfer hopper through conduit 65 into the stuffing hopper 21 under pressure. As the material enters the hopper through the pipe 67, any air in the semi-fluid material will expand and the air bubbles flow outwardly below the plate 73 to the atmosphere. Since the discharge opening 68 is maintained in contact with the material M in the stuffing hopper, no additional air is entrapped or entrained during feeding of the material to the hopper.

The accordion pleated sausage casing C is slipped onto the stuffing nozzle 36 in the conventional manner and one end of the casing is closed as by tying. The valve 34 is then opened by manipulating the handle 35 to admit material to the casing. As the handle is opened, the cam 55 operates the switch 51 to engage the clutch 48 and disengage the brake 60 to thereby start the stuffing pump 26. The stuffing pump feeds the material into the casing at a rate controlled by the stuffing pump and which, as previously mentioned, is variable under the control of the variable speed drive 42. When the casing is filled, the valve is shut off and the switch simultaneously operated to disengage the clutch and engage the brake. This locks the pump against rotation and maintains the semi-fluid material in the discharge conduit 33 under pressure. Thus, expansion of the material in the conduit 33 when the stuffing pump is stopped is effectively prevented to maintain the material at a preselected consistency.

We claim:

1. An apparatus for removing occluded air from semi-fluid materials and for stuffing the material into a casing comprising, a stuffing nozzle, a hopper having an outlet and a bottom wall converging downwardly to said outlet, a pump having an inlet communicating with the hopper outlet and a delivery outlet communicating with said stuffing nozzle, means for feeding semi-fluid material to the hopper, said feed means including conduit means having a discharge end extending into said hopper and having a downwardly facing discharge opening at said discharge end, means mounting said discharge end of said conduit means for movement relative to said hopper to enable raising and lowering of said discharge opening, and a plate attached to the discharge end of said conduit means and extending outwardly therefrom around the discharge opening to support the discharge end of said conduit means on the semi-fluid material in the hopper whereby to maintain the discharge opening of the conduit means adjacent the upper level of the semi-fluid material in the hopper, said plate being disposed in substantial vertical alignment with said outlet in said bottom wall of said hopper to overlie said outlet.

2. An apparatus for removing occluded air from semi-fluid materials and for stuffing the material into a casing comprising, a stuffing nozzle, a stuffing hopper having a lower end and an outlet adjacent its lower end, a stuffing pump having an inlet communicating with the hopper outlet and a delivery outlet communicating with the stuffing nozzle, a transfer hopper for receiving a charge of semi-fluid material, a transfer pump having an inlet communicating with said transfer hopper for withdrawing material therefrom and an outlet for delivering the material under pressure, conduit means having an inlet end communicating with the outlet of the transfer pump and having a discharge end extending into the stuffing hopper, said discharge end having a downwardly facing discharge opening, means mounting the discharge end of said conduit means for vertical movement relative to said stuffing hopper, and a plate on the discharge end of said conduit means extending outwardly therefrom around said discharge opening for supporting the discharge end of said conduit means on the semi-fluid material in the stuffing hopper whereby to maintain the discharge opening of the conduit means adjacent the upper level of the semi-fluid material in said hopper.

3. The combination of claim 2 including means responsive to the position of said plate in said stuffing hopper to start said transfer pump when the material drops to a preselected lower level and to stop the transfer pump when the material reaches a preselected upper level in the stuffing hopper.

4. An apparatus for conveying semi-fluid material from a grinder, for removing air from the material and for stuffing the material into sausage casings comprising, a transfer hopper for receiving ground stuffing in a semi-fluid state from a grinder, a transfer pump having an inlet communicating with said transfer hopper for withdrawing the semi-fluid stuffing therefrom and an outlet for delivering the material under pressure, a stuffing hopper having a hopper outlet and a bottom wall converging downwardly to said hopper outlet, a delivery conduit having an inlet end connected to said transfer pump and having a discharge end extending into said stuffing hopper, means mounting the discharge end of said conduit for vertical movement relative to said stuffing hopper, said discharge end of said conduit having a downwardly facing discharge opening, a plate on said discharge end of said conduit extending generally horizontally outwardly therefrom around said discharge opening for supporting the discharge end of said conduit on the upper surface of the stuffing material in the stuffing hopper, a stuffing pump having an inlet communicating with the lower end of the stuffing hopper for withdrawing material therefrom and an outlet for delivering the material under pressure, and a stuffing nozzle communicating with said outlet of said stuffing pump.

5. The combination of claim 4 including means responsive to opening and closing of said stuffing nozzle for starting and stopping said stuffing pump.

6. The combination of claim 4 wherein said stuffing pump has a clutch for selectively starting and stopping the stuffing pump, and means including a switch controlled by said stuffing nozzle for respectively engaging and disengaging said clutch when said nozzle is opened and closed.

7. The combination of claim 4 including means responsive to movement of said discharge end of the conduit to a preselected lower level in the stuffing hopper for starting said transfer pump and responsive to movement of said discharge end of the conduit to a preselected upper level in the stuffing hopper for stopping said transfer pump.

References Cited in the file of this patent

UNITED STATES PATENTS

| | | |
|---|---|---|
| 1,639,270 | Potter | Aug. 16, 1927 |
| 2,014,617 | Fischer | Sept. 17, 1935 |
| 2,348,151 | Rotter et al. | May 2, 1944 |
| 2,368,672 | McNamara | Feb. 6, 1945 |
| 2,408,221 | Michel | Sept. 24, 1946 |
| 2,692,923 | Ash | Oct. 26, 1954 |
| 2,805,444 | Hensgen et al. | Sept. 10, 1957 |